US012678778B2

(12) United States Patent
Almofleh et al.

(10) Patent No.: US 12,678,778 B2
(45) Date of Patent: Jul. 14, 2026

(54) TWO-STAGE CARBON DIOXIDE ADSORPTION USING COLLAPSED ZEOLITE WITH ULTRA-SMALL PORES

(71) Applicant: Saudi Arabian Oil Company, Dhahran (SA)

(72) Inventors: Ali A. Almofleh, Dhahran (SA); Georgios Lithoxoos, Dhahran (SA); Rashid M. Othman, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 324 days.

(21) Appl. No.: 18/587,656

(22) Filed: Feb. 26, 2024

(65) Prior Publication Data

US 2025/0269317 A1    Aug. 28, 2025

(30) Foreign Application Priority Data

Feb. 22, 2024    (GR) ............................... 20240100130

(51) Int. Cl.
*B01D 53/04*        (2006.01)
*B01D 53/26*        (2006.01)
        (Continued)

(52) U.S. Cl.
CPC ........ *B01J 35/647* (2024.01); *B01D 53/0423* (2013.01); *B01D 53/261* (2013.01);
        (Continued)

(58) Field of Classification Search
None
See application file for complete search history.

(56) References Cited

U.S. PATENT DOCUMENTS 3,752,877  A    8/1973  Beavon
3,824,766  A    7/1974  Valentine et al.
        (Continued)

FOREIGN PATENT DOCUMENTS

CN    116550090 A  *  8/2023  ............. B01D 53/04
EP        1142628      10/2001
        (Continued)

OTHER PUBLICATIONS

CN116550090A_ENG (Espacenet machine translation of Zhang) (Year: 2023).*
        (Continued)

*Primary Examiner* — Gabriel E Gitman
(74) *Attorney, Agent, or Firm* — Fish & Richardson P.C.

(57)        ABSTRACT

A method of separating carbon dioxide ($CO_2$) from air, where the method includes: feeding air into a cooler to generate cooled air, the cooled air including nitrogen ($N_2$), oxygen ($O_2$), water ($H_2O$), and $CO_2$; feeding the cooled air to a first adsorption column including a first zeolite adsorbent to selectively capture the $H_2O$ from the cooled air, generating dried cooled air; and feeding the dried cooled air to a second adsorption column including a second zeolite adsorbent to selectively capture the $CO_2$ from the dried cooled air, generating a tail gas, wherein the second zeolite adsorbent includes a Linde Type A (LTA) aluminosilicate zeolite that is hydrolyzed and at least partially collapsed.

20 Claims, 4 Drawing Sheets

(51) Int. Cl.
  *B01D 53/28* (2006.01)
  *B01J 35/64* (2024.01)
  *B01J 29/70* (2006.01)

(52) U.S. Cl.
  CPC ...... *B01D 53/28* (2013.01); *B01D 2253/1085*
    (2013.01); *B01D 2253/308* (2013.01); *B01D*
    *2257/504* (2013.01); *B01D 2257/80* (2013.01);
    *B01D 2258/06* (2013.01); *B01D 2259/40083*
    (2013.01); *B01J 29/7003* (2013.01)

(56) References Cited

U.S. PATENT DOCUMENTS

| | | | |
|---|---|---|---|
| 4,001,386 | A | 1/1977 | Klein et al. |
| 4,178,358 | A | 12/1979 | Smith et al. |
| 5,023,069 | A | 6/1991 | Serrand |
| 6,402,813 | B2 | 6/2002 | Monereau et al. |
| 8,197,696 | B1 * | 6/2012 | Bader ...................... C02F 1/66 |
| | | | 210/639 |
| 8,361,200 | B2 | 1/2013 | Sayari et al. |
| 8,524,184 | B2 | 9/2013 | Iyengar et al. |
| 8,551,199 | B2 | 10/2013 | Thacker et al. |
| 8,551,229 | B2 | 10/2013 | Hufton et al. |
| 8,702,847 | B2 | 4/2014 | Lackner et al. |
| 9,149,761 | B2 | 10/2015 | Northrop et al. |
| 9,333,482 | B2 * | 5/2016 | Wang ...................... C10L 3/105 |
| 9,731,974 | B2 | 8/2017 | Weiss et al. |
| 10,188,988 | B2 | 1/2019 | Debrock et al. |
| 10,232,305 | B2 | 3/2019 | Gebald et al. |
| 10,662,061 | B1 | 5/2020 | Lithoxoos et al. |
| 10,744,449 | B2 | 8/2020 | Ravikovitch et al. |
| 2004/0226441 | A1 | 11/2004 | Palmer |
| 2011/0185896 | A1 | 8/2011 | Sethna et al. |
| 2011/0268650 | A1 | 11/2011 | Lamar |
| 2013/0211171 | A1 | 8/2013 | Riemann et al. |
| 2013/0247766 | A1 | 9/2013 | Oppenheim et al. |
| 2017/0190574 | A1 | 7/2017 | Ercan et al. |
| 2020/0001225 | A1 | 1/2020 | Ritter et al. |
| 2020/0385274 | A1 | 12/2020 | Chow et al. |
| 2022/0242729 | A1 | 8/2022 | Lithoxoos et al. |
| 2022/0274088 | A1 | 9/2022 | Fu et al. |
| 2022/0280912 | A1 * | 9/2022 | Fu ........................ B01J 20/2808 |

FOREIGN PATENT DOCUMENTS

| | | |
|---|---|---|
| IN | 2015003855 | 1/2018 |
| KR | 101946733 | 2/2019 |
| WO | WO 2017023856 | 2/2017 |
| WO | WO 2021130530 | 7/2021 |
| WO | WO 2022109746 | 6/2022 |

OTHER PUBLICATIONS

Kim et al. (2017). Gradual disordering of LTA zeolite for continuous tuning of the molecular sieving effect. The Journal of Physical Chemistry C, 121(12), 6807-6812. (Year: 2017).*

U.S. Appl. No. 17/166,821, filed Feb. 2021, Lithoxoos et al.

Petersen et al., "Fuel and CO2 Emission Reductions in Oil and Gas Refining Industry Thermal Oxidizers," American Flame Research Committee 2016 Industrial Combustion Symposium, 2016, 14 pages.

Powell et al., "Polymeric CO2/N2 gas separation membranes for the capture of carbon dioxide from power plant flue gases", Journal of Membrane Science, Aug. 2006, 279(1-2), 49 pages.

Sanz-Pérez et al., "Direct Capture of CO2 from Ambient Air," Chemical Reviews, Aug. 2016, 116(19):11840-11876, 37pages.

Wahedi et al., "Economic assessment of Temperature Swing Adsorption systems as Claus Tail Gas Clean Up Units," Chemical Engineering Science, 2015, 126:186-195, 10 pages.

* cited by examiner

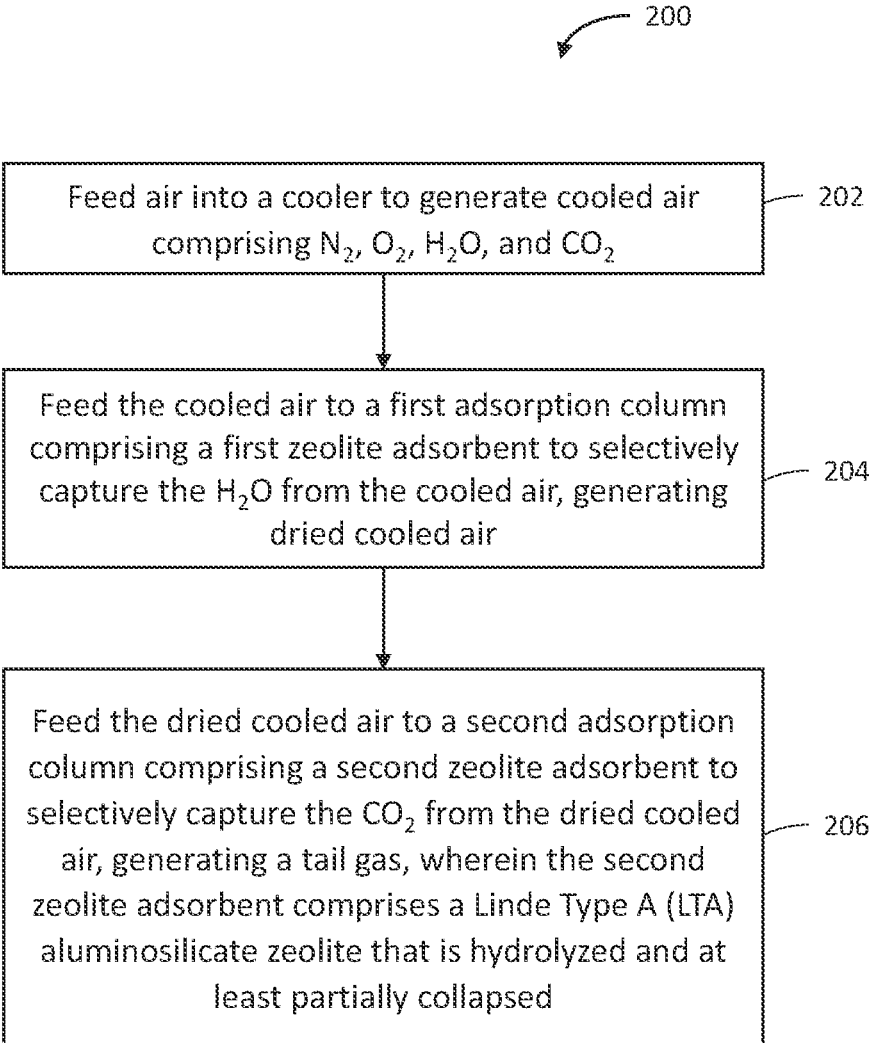

— 200

Feed air into a cooler to generate cooled air comprising $N_2$, $O_2$, $H_2O$, and $CO_2$ — 202

Feed the cooled air to a first adsorption column comprising a first zeolite adsorbent to selectively capture the $H_2O$ from the cooled air, generating dried cooled air — 204

Feed the dried cooled air to a second adsorption column comprising a second zeolite adsorbent to selectively capture the $CO_2$ from the dried cooled air, generating a tail gas, wherein the second zeolite adsorbent comprises a Linde Type A (LTA) aluminosilicate zeolite that is hydrolyzed and at least partially collapsed — 206

FIG. 2A

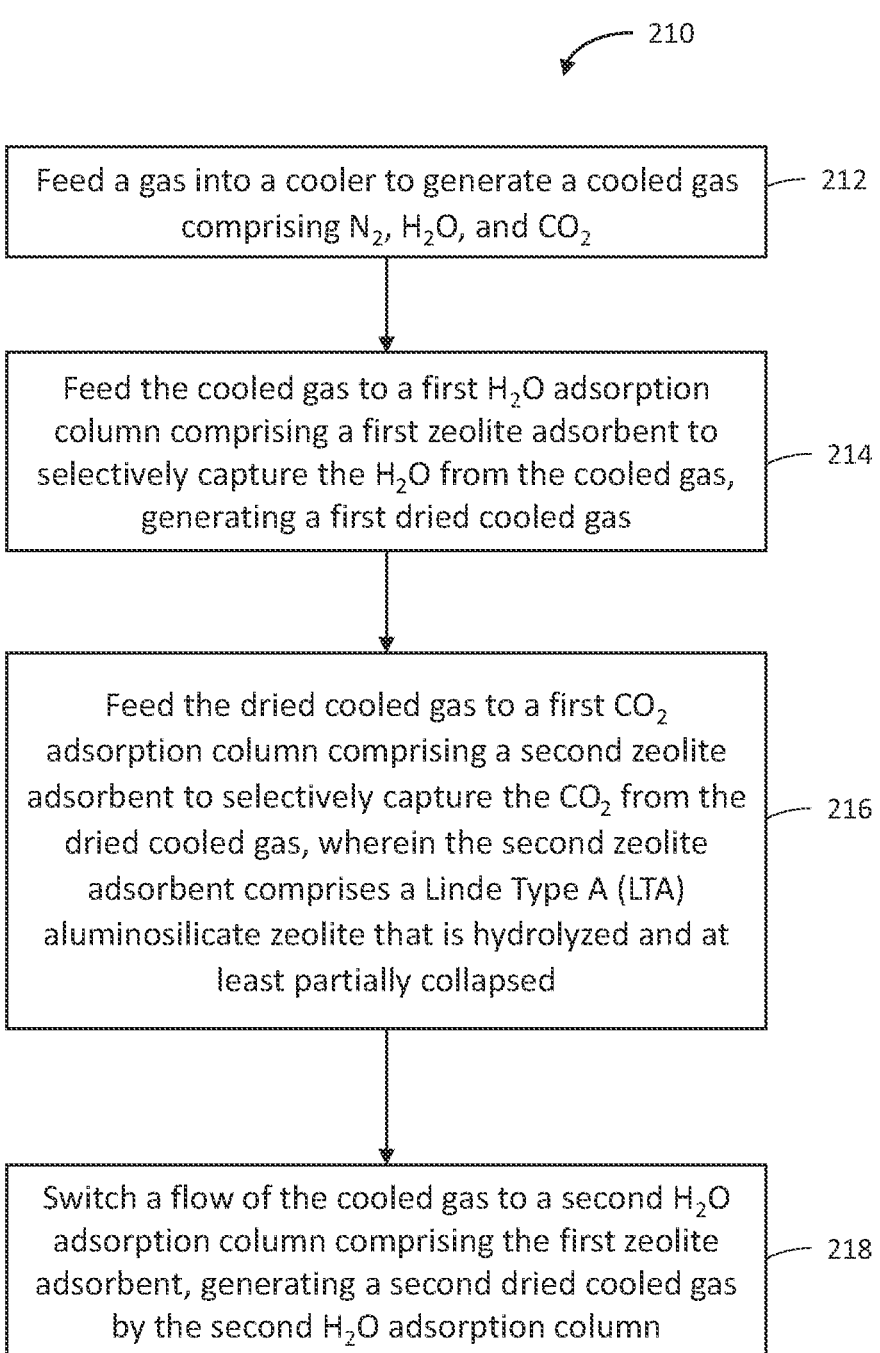

210

Feed a gas into a cooler to generate a cooled gas comprising $N_2$, $H_2O$, and $CO_2$ — 212

Feed the cooled gas to a first $H_2O$ adsorption column comprising a first zeolite adsorbent to selectively capture the $H_2O$ from the cooled gas, generating a first dried cooled gas — 214

Feed the dried cooled gas to a first $CO_2$ adsorption column comprising a second zeolite adsorbent to selectively capture the $CO_2$ from the dried cooled gas, wherein the second zeolite adsorbent comprises a Linde Type A (LTA) aluminosilicate zeolite that is hydrolyzed and at least partially collapsed — 216

Switch a flow of the cooled gas to a second $H_2O$ adsorption column comprising the first zeolite adsorbent, generating a second dried cooled gas by the second $H_2O$ adsorption column — 218

FIG. 2B

TWO-STAGE CARBON DIOXIDE ADSORPTION USING COLLAPSED ZEOLITE WITH ULTRA-SMALL PORES

TECHNICAL FIELD

This disclosure relates to methods and systems of two-stage carbon dioxide ($CO_2$) adsorption using collapsed zeolite with ultra-small pores.

BACKGROUND

With the rising concerns of climate change and greenhouse gas emissions, governments and companies are looking for ways to reduce their energy intensity and carbon footprint. Because the rising atmospheric carbon dioxide ($CO_2$) concentration has been reported as the major factor of the climate change, various technologies are needed to reduce the $CO_2$ emissions form industry. Such technologies include $CO_2$ separation, transportation, and sequestration.

SUMMARY

This disclosure describes technologies relating to methods and systems of two-stage carbon dioxide ($CO_2$) adsorption from air using collapsed zeolite.

BRIEF DESCRIPTION OF DRAWINGS

FIGS. 2A-2B are process flow diagrams of the method of $CO_2$ adsorption.

DETAILED DESCRIPTION

Implementations described herein provide methods and systems of two-stage $CO_2$ adsorption from a gas stream, e.g., atmospheric air or process tail gas from oil and gas production, using a collapsed zeolite adsorbent. The first stage of the process selectively adsorbs water ($H_2O$) in the gas stream and the second stage subsequently uses the collapsed zeolite to selectively capture $CO_2$ from the dried gas stream. Accordingly, in various implementations, the system of two-stage $CO_2$ adsorption can include: a) a fan or compressor for directing the gas stream to a cooler; b) a cooler for lowering the temperature of the gas stream; c) a first stage adsorption unit for $H_2O$ separation; and d) a second stage adsorption unit for $CO_2$ separation.

The two-stage $CO_2$ adsorption described in this disclosure can be applied to direct air capture (DAC), a physical or chemical process to separate $CO_2$ from the atmospheric air. Using the partially collapsed zeolite adsorbents, the two-stage $CO_2$ adsorption can improve the DAC process efficiency and thereby reduce the separation cost compared with other technologies such as liquid adsorption (e.g., amine or alkali and alkali earth hydroxide). The two-stage $CO_2$ adsorption can also advantageously be performed as a continuous process using multiple adsorption columns, where one column can be regenerated while another column is used for adsorption.

In the following, the method and system of two-stage $CO_2$ adsorption is described referring to FIG. 1. FIGS. 2A-2B are example process flow diagrams for the method of $CO_2$ adsorption. Examples experimental results are then described referring to FIGS. 3-4.

Two-Stage $CO_2$ Separation Using Collapsed Zeolite

Figure 1:
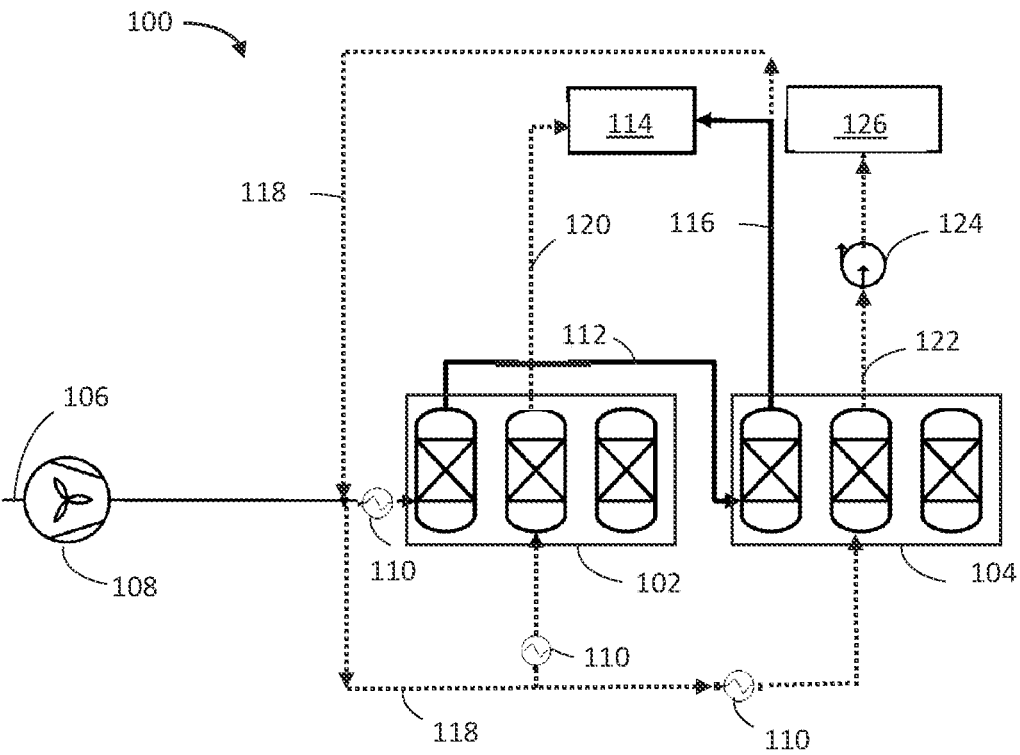
FIG. 1 is a block diagram of two-stage carbon dioxide ($CO_2$) adsorption using a partially collapsed zeolite.

FIG. 1 is a block diagram of two-stage $CO_2$ adsorption 100. Solid and dotted arrows indicate gas flows such as inflow and outflow, where the two types of arrows are used to suggest the temporal separation or alternate operations. In various implementations, the two-stage $CO_2$ adsorption 100 is used to capture $CO_2$ directly from the atmospheric air. In some implementations, the two-stage $CO_2$ adsorption 100 is a part of the oil and gas production/refinery facility and captures $CO_2$ from the tail gas.

In FIG. 1, the system of the two-stage $CO_2$ adsorption 100 can include a $H_2O$ adsorption unit 102 followed by a $CO_2$ adsorption unit 104. In FIG. 1, each unit has, for example, three adsorption columns that can be configured to operate alternatively. For illustration purpose, some gas flows, e.g., gas flows from and to a third column, are omitted in FIG. 1.

In various implementations, each unit has one or more columns, and the number of columns can be selected based on the volume of each column and required process capacity, e.g., target air flow rate, for the two-stage $CO_2$ adsorption 100.

In operation, a feed gas 106 is sent to a fan 108 configured to deliver the feed gas to the $H_2O$ adsorption unit 102. In various implementations, the feed gas 106 is atmospheric air. The feed gas 106 can therefore contain nitrogen ($N_2$), oxygen ($O_2$), $H_2O$, and $CO_2$. For example, the feed gas 106 can contain about 78.1 mol % $N_2$, about 20.9 mol % $O_2$, 0.9 mol % argon (Ar), about 400 parts per million (ppm) $CO_2$. In some implementations, the feed gas 106 is air containing between about 380 ppm and about 420 ppm. In one embodiment, the feed gas 106 contains 380 ppm $CO_2$ or greater. In one or more implementations, the $H_2O$ content in the feed gas 106 can be between 0 mol % and about 3 mol %. Further, the feed gas 106 can also contain helium (He), methane ($CH_4$), argon (Ar), or hydrogen ($H_2$), depending on the source of the feed gas 106.

The fan 108 can include or be a part of a compressor to compress the feed gas 106. In some implementations, the feed gas 106 can be compressed to a pressure of 10 bar (1 MPa) or less, for example, about 8 bar (0.8 MPa).

The feed gas 106 can be cooled using a heat exchanger 110 before being sent to the first stage of adsorption. In some implementations, the feed gas 106 is cooled to a temperature between −50° C. and 50° C., for example about 25° C. The temperature of the feed gas 106 can be adjusted to the target adsorption temperature of the first stage. In FIG. 1, each column can be equipped with designated one of the heat exchangers 110. In some implementations, one heat exchanger can be used for more than one adsorption column. Further, depending on the initial $H_2O$ content in the feed gas 106, the two-stage $CO_2$ adsorption 100 can include a condenser to condense $H_2O$ by cooling the feed gas 106, where the $H_2O$ adsorption unit 102 is configured to capture the residual $H_2O$ in the feed gas 106.

In various implementations, the adsorption columns of the $H_2O$ adsorption unit 102 are charged with a first zeolite adsorbent that can selectively adsorb $H_2O$ from the feed gas 106. The first zeolite adsorbent can be, for example, molecular sieve 3A. Molecular sieve 3A is a synthetic crystalline aluminosilicate with a regular micropores structure characterized with a pore diameter about 3 angstrom (A). It is commonly used for drying of various gases and polar liquids. The $H_2O$ adsorption can be performed at between −50° C. and 50° C., for example about 25° C. and at 10 bar (1 MPa) or less, for example, about 8 bar (0.8 MPa). The $H_2O$ molecules can be selectively adsorbed while the rest of the gases pass through the column bed towards the $CO_2$ adsorption as a dried gas 112 in FIG. 1. The adsorbed $H_2O$ can be recovered separately during the regeneration process of the column. In some implementations, the $H_2O$ content in the dried gas 112 is about 4 ppm or less, for example, less than 2 ppm. The dried gas 112 can then be sent to the $CO_2$ adsorption unit 104.

After the $H_2O$ adsorption, the $CO_2$ adsorption from the dried gas 112 can be performed in the $CO_2$ adsorption unit 104. In various implementations, the adsorption columns of the $CO_2$ adsorption unit 104 are charged with a second zeolite adsorbent. The second zeolite adsorbent can be a zeolite-based adsorbent that is processed to lose the crystallinity partially or entirely by structural collapse of a precursor zeolite material. In some implementations, the second zeolite adsorbent includes a Linde Type A (LTA) aluminosilicate zeolite that is hydrolyzed and at least partially collapsed. The structural collapse can decrease the average pore size of the precursor zeolite material, improving the $CO_2$ adsorption performance such as $CO_2$ selectivity. This class of partially collapsed aluminosilicate adsorbents is referred to as "ultra-small pore aluminosilicates" in this disclosure. The ultra-small pore aluminosilicates can be an amorphous material showing no substantial peak in X-ray diffraction (XRD) measurements.

In some implementations, the ultra-small pore aluminosilicates as the adsorbent for the two-stage $CO_2$ adsorption in this disclosure can be synthesized according to the procedure described in U.S. Pat. No. 9,333,482B2, the disclosure of which is incorporated herein by reference. For example, a commercially available sodium LTA zeolite with small-pore size (pore diameter ~4 angstrom (Å)) (also referred to as "NaA") can be used as the precursor for forming the amorphous adsorbent. Briefly, the method for forming the ultra-small pore aluminosilicates includes ion-exchange, calcination and liquid $H_2O$ treatment, e.g., at a temperature around 25° C. or higher, of the precursor to irreversibly transform the crystalline aluminosilicate zeolite with a small pore size into the highly selective, ultra-small pore size amorphous adsorbent. Therefore, ultra-small pore aluminosilicates generally have an average pore size smaller than the precursor zeolite such as NaA. In other implementations, the liquid $H_2O$ treatment of the precursor may be replaced with steam treatment, including superheated steam. These treatments with $H_2O$ can induce hydrolysis of the material and result in a hydrolyzed aluminosilicate. The introduction of water following calcination results in the hydrolysis of destabilized Si—O—Al bonds. The hydrolysis of susceptible Si—O—Al bonds may lead to additional pore size narrowing for enhancing the selectivity properties of the adsorbent composition without adversely impacting the adsorption capacity of the material.

In some implementations, the ion-exchange can be performed using an ammonium ($NH_4^+$) ion. Accordingly, the second zeolite adsorbent (the ultra-small pore aluminosilicates) includes Na and $NH_4^+$ ions. In reacting an $NH_4^+$ containing ion-exchange material with a sodium aluminosilicate zeolite such as NaA, the Na/Al ratio will decrease with an increased degree of $NH_4^+$ substitution for the $Na^+$ cation of the crystalline zeolite. In one implementation, the ultra-small pore aluminosilicates have a Na/Al ratio in a range of from about 0.60 to about 1.00. In other implementations, the ultra-small pore aluminosilicates have a Na/Al ratio in a range of from about 0.60 to about 0.77. Here, the "cation/Al ratio" is the stoichiometric ratio of the exchangeable zeolite cation to aluminum in the zeolite, for instance, a sodium aluminosilicate zeolite such as NaA is expressed as a "Na/Al ratio". The degree of cation exchange is dependent on both the temperature and the cation concentration in the ion-exchange material.

The cation-exchanged zeolite may begin collapsing at temperatures greater than about 100° C. In some implementations, the calcination temperature is in a range of from about 200° C. to about 500° C., for instance about 400° C. Alternatively, thermally collapsing a sodium aluminosilicate zeolite such as NaA in the absence of cation exchange requires high calcination temperatures, for example temperatures greater than about 700° C. However, the resulting collapsed zeolite structure is non-porous and therefore unsuitable for performing molecular separations.

In some implementations, the ultra-small pore aluminosilicates for the second zeolite adsorbent can have pores characterized by a pore aperture size of from 0.33 nanometer (nm) to 0.38 nm, smaller than the pore size of the original NaA (0.4 nm). Further, the second zeolite adsorbent can also be characterized by a $CO_2/CH_4$ equilibrium selectivity factor in a range of 3.8 to 40. Although not wishing to be limited by any theory, the second zeolite adsorbent can exhibit $CO_2$ selectivity based on the difference in polarizabilities of the gases ($CO_2$=2.507 cubic angstrom ($Å^3$), $O_2$=1.562 $Å^3$, $N_2$=1.710 $Å^3$) and the difference in their kinetic diameters ($CO_2$=330 picometer (pm), $O_2$=346 in pm, $N_2$=364 pm). The ultra-small pore aluminosilicates can, with its polarity, attract $CO_2$ molecules more than $O_2$ molecules and has a pore size which prohibits the entrance of molecules larger than $CO_2$.

The $CO_2$ adsorption can be performed at between −50° C. and 50° C., for example about 25° C. and at 10 bar (1 MPa) or less, for example, about 8 bar (0.8 MPa). In some implementations, the $CO_2$ adsorption temperature and pressure can be same as those for the $H_2O$ adsorption, but they can be selected independently and set differently in other implementations. The $CO_2$ molecules can be selectively adsorbed while the rest of the gases pass through the column bed towards a vent 114 as a tail gas 116 in FIG. 1. The tail gas 116 obtained after the $CO_2$ adsorption can be a mixture of $O_2$, $N_2$, and Ar. In some implementations, the $CO_2$ content in the tail gas 116 is about 10 ppm or less, for example, less than 5 ppm. In one or more implementations, the $CO_2$ adsorption can be performed to reduce the $CO_2$ content in the feed gas 106 to any level, for example, about 300 ppm or less in the tail gas 116. A slip stream 118 of the tail gas 116 can be looped back and after being heated it is used for the regeneration of the $H_2O$ adsorption unit 102, the $CO_2$ adsorption unit 104, or both.

Multiple Adsorption Columns

As illustrated in FIG. 1, the system of the two-stage $CO_2$ adsorption 100 can include multiple adsorption columns for each of the $H_2O$ adsorption unit 102 and the $CO_2$ adsorption unit 104. In various implementations, the $H_2O$ adsorption can be performed using a first $H_2O$ adsorption column until its adsorbent reaches its capacity and saturation. Once the first adsorbent bed is saturated, the flow of the feed gas 106 to the first $H_2O$ adsorption column can be stopped, and the flow is switched to a second $H_2O$ adsorption column to continue the $H_2O$ adsorption, while the first $H_2O$ adsorption column becomes available for regeneration.

The adsorbed $H_2O$ can be released from the column by a regeneration process. For example, a humid gas 120 can be formed by flowing the slip stream 118 or using vacuum and sent to the vent 114 as illustrated in FIG. 1, or to a condenser to condense $H_2O$. The slip steam 118 can be further split into two or more streams for regeneration of multiple adsorption columns of the $H_2O$ adsorption unit 102, the $CO_2$ adsorption unit 104, or both.

In some implementations, the regeneration can include guiding the slip stream 118 through a fired heat blower, to elevate the column temperature and release the adsorbed molecules. After completing the regeneration, the adsorption column becomes available for another adsorption stage. The adsorption-regeneration cycle can be based on temperature-swing mechanism, pressure-swing mechanism, or both.

Similarly, the $CO_2$ adsorption can be performed using a first $CO_2$ adsorption column until its adsorbent reaches its capacity and saturation. Once the first adsorbent bed is saturated, the flow of the dried gas 112 to the first $CO_2$ adsorption column can be stopped, and the flow is switched to a second $CO_2$ adsorption column to continue the $CO_2$ adsorption, while the first $CO_2$ adsorption column becomes available for regeneration.

The adsorbed $CO_2$ can be released from the column by a regeneration process. For example, a $CO_2$-rich gas 122 can be formed by flowing a carrier gas or using a vacuum pump 124 to apply vacuum and sent to a $CO_2$ sequestration unit 126, such as a $CO_2$ liquefaction unit, as illustrated in FIG. 1. In some implementations, $CO_2$ sequestration unit 12 can be connected to a facility for permanent storage, e.g., by underground sequestration. After completing the regeneration, the adsorption column becomes available for another adsorption stage. The adsorption-regeneration cycle can be based on temperature-swing mechanism, pressure-swing mechanism, or both. Accordingly, each of the $H_2O$ adsorption unit 102 and the $CO_2$ adsorption unit 104 can include one or more temperature controller to maintain the process temperatures for adsorption and regeneration.

Having multiple adsorption columns can allow a continuous adsorption-regeneration process without interruption. For example, for either of $H_2O$ or $CO_2$ adsorption, the method can include (1) flowing the gas, e.g., the feed gas 106 or the dried gas 112, to a first adsorption column until its saturation; (2) stopping the gas flow to the first adsorption column; (3) flowing the gas to a second adsorption column; (4) regenerating the first adsorption column while adsorbing $H_2O$ or $CO_2$ using the second adsorption column; (5) after regeneration, switching the gas flow back to the first adsorption column; (6) regenerating the second adsorption column while adsorbing $H_2O$ or $CO_2$ using the first adsorption column; and (7) repeating the steps (2)-(6). Accordingly, the system of two-stage $CO_2$ adsorption 100 can include a gas flow control system configured to switch the feed gas 106 and the dried gas 112 between different adsorption columns. As illustrated in FIG. 1, in some implementations, the system of two-stage $CO_2$ adsorption 100 can have three adsorption columns for each stage. In these implementations, a first column can be used for adsorption, while a second column is being regenerated and a third column is standing by.

The steps of the continuous cyclic adsorption-regeneration process can be modified and adopted in various ways depending on the number of adsorption columns and adsorption capacity of each column. In some implementations, the switching of the columns can be synchronized between the $H_2O$ and $CO_2$ adsorption, where the dried gas from the first $H_2O$ adsorption column is sent to the first $CO_2$ adsorption column and another dried gas from the second $H_2O$ adsorption column is sent to the second $CO_2$ adsorption column. In these implementations, the regeneration of the first $H_2O$ adsorption column and the first $CO_2$ adsorption column can be performed simultaneously.

In some implementations, the gas, e.g., the feed gas 106 and the dried gas 112, can be sent to more than one adsorption columns at the same time. For example, the feed gas 106 can be sent to first two $H_2O$ adsorption columns while a third $H_2O$ adsorption column is being regenerated. The gas delivery for adsorption and regeneration between multiple adsorption columns can be selected in consideration of various parameters such as the column volume, the adsorption capacity, and the adsorbent conditions.

FIGS. 2A-2B are example process flow diagrams of a method of the two-stage $CO_2$ adsorption 100 as described above. In FIG. 2A, a method 200 according to an implementation starts with feeding air 202 into a cooler to generate cooled air, where the cooled air includes nitrogen ($N_2$), oxygen ($O_2$), water ($H_2O$), and $CO_2$, followed by feeding the cooled air 204 to a first adsorption column including a first zeolite adsorbent to selectively capture the $H_2O$ from the cooled air, generating dried cooled air. Subsequently, the dried cooled air is fed 206 to a second adsorption column including a second zeolite adsorbent to selectively capture the $CO_2$ from the dried cooled air, generating a tail gas, where the second zeolite adsorbent includes a Linde Type A (LTA) aluminosilicate zeolite that is hydrolyzed and at least partially collapsed.

In FIG. 2B, another method 210 according to an implementation of the system of the two-stage $CO_2$ adsorption 100 starts with feeding a gas 212 into a cooler to generate a cooled gas, the cooled gas including $N_2$, $H_2O$, and $CO_2$, followed by feeding the cooled gas 214 to a first $H_2O$ adsorption column including a first zeolite adsorbent to selectively capture the $H_2O$ from the cooled gas, generating first dried cooled gas. The first dried cooled gas is then fed 216 to a first $CO_2$ adsorption column including a second zeolite adsorbent to selectively capture the $CO_2$ from the first dried cooled gas, where the second zeolite adsorbent comprises a Linde Type A (LTA) aluminosilicate zeolite that is hydrolyzed and at least partially collapsed. Subsequently, a flow of the cooled gas can be switched 218 to a second $H_2O$ adsorption column including the first zeolite adsorbent, generating a second dried cooled gas by the second $H_2O$ adsorption column.

EXAMPLES

To demonstrate the performance of collapsed zeolite adsorbents, adsorption experiments were carried out using LTA zeolite samples with a varying degree of structural collapse.

The collapsed zeolite adsorbents were prepared by ion-exchange and calcination of a sodium LTA zeolite (NaA). An aqueous solution of ammonium nitrate ($NH_4NO_3$) at various concentrations was used for the ion-exchange with varying degree of structural collapse. Each sample was synthesized by initially suspending 1 gram of the NaA zeolite in 20 mL of $NH_4NO_3$ solution and the solution was stirred for six hours at room temperature to form ion-exchanged zeolite precursors. The ammonium ($NH_4^+$) ion substitutes for the sodium ($Na^+$) ion to varying degrees based upon the ammonium nitrate concentration. The ammonium nitrate concentration was increased from about 0.14 M to about 0.42 M from sample 1 to 6, resulting in decreasing Na/Al ratio. The precursors are collected by filtration, washed with deionized water followed by acetone, and dried at 333 K for 24 hours. The dried, ion-exchanged zeolite precursors were then calcined in a plug-flow reactor under flowing dry air (25 mL/minute) at 673 K (temperature ramp: 1 K/minute) for 2 hours.

Figure 3:
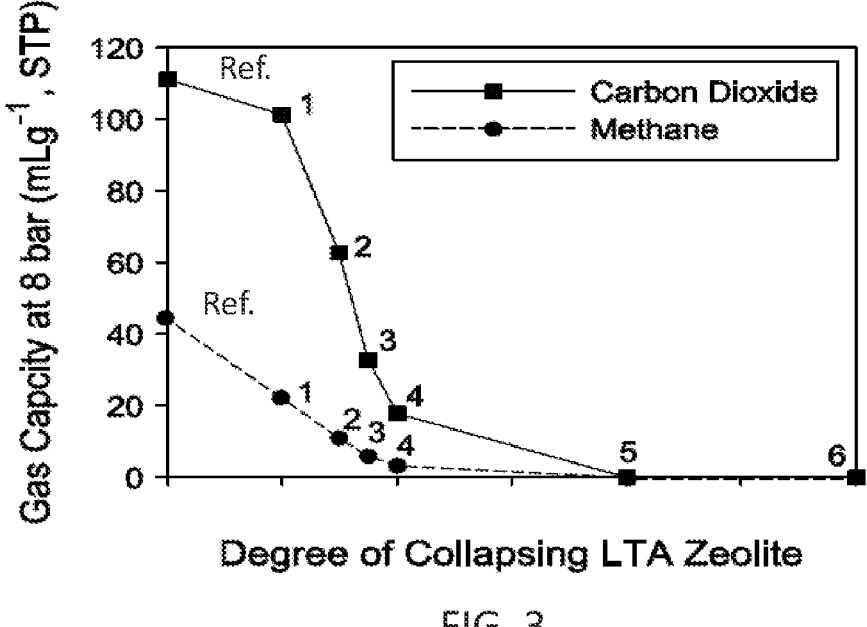
FIG. 3 is a graph of the gas adsorption capacity of collapsed zeolite adsorbents.

FIG. 3 shows a graph of the $CO_2$ and $CH_4$ gas adsorption capacities at 8 bar (0.8 MPa). A higher degree of cation exchange is assumed to correlate to a greater degree of structural collapse, and therefore the Na/Al ratio is determined and used as the parameter representing the degree of structural collapse.

While both $CO_2$ and $CH_4$ adsorption capacities decrease as the collapse of the zeolite structure progresses, the $CH_4$ adsorption capacity decreases more rapidly than the $CO_2$ adsorption capacity. Although not wishing to be limited by any theory, the pore size decreases with the progression of structural collapse and the kinetic diameter of $CH_4$ (ca. 380 pm) is larger than $CO_2$ (ca. 330 pm). As a result, $CH_4$ molecules can be excluded more upon the reduction in pore size. The same trend is expected with ambient air gases such as $N_2$ and $O_2$ with their kinetic diameters of ca. 364 μm and 346 pm, respectively. With the continued progression of structural collapse, the zeolite adsorbent eventually loses its adsorption capacity entirely in both $CO_2$ and $CH_4$. This result demonstrates the advantage of controlling the degree of structural collapse in preparation of the adsorbent to achieve "partially collapsed" zeolite adsorbent.

Figure 4:
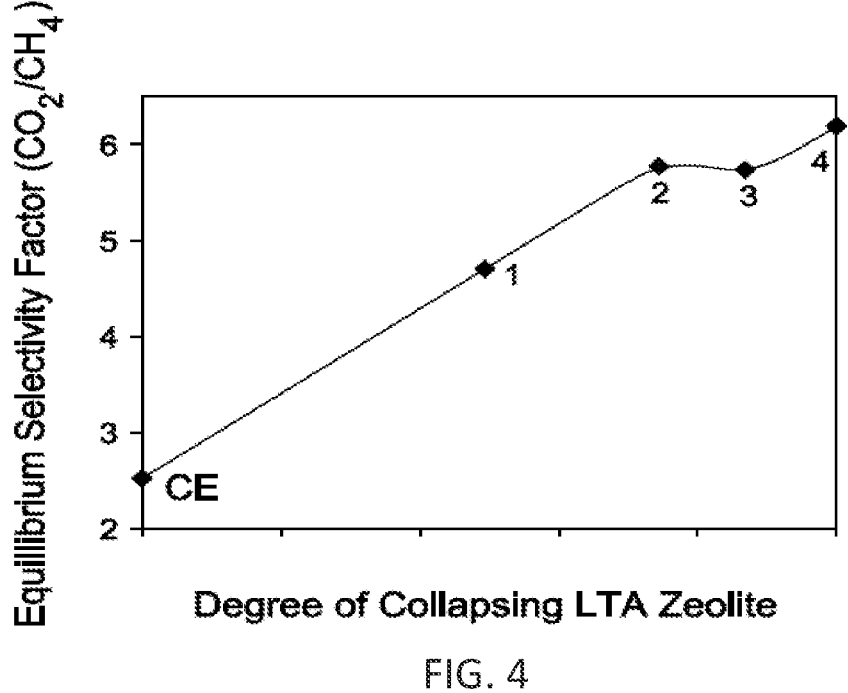
FIG. 4 is a graph of the gas selectivity of collapsed zeolite adsorbents.

FIG. 4 shows a graph of the $CO_2$ and $CH_4$ gas adsorption selectivity at 298 K and 8 bar (0.8 MPa). The data were collected for the "partially collapsed" samples that exhibited some $CO_2$ adsorption capacity in the previous experiments described above. The $CO_2$ selectivity over $CH_4$ improves from about 2.5 to about 5.7 with the structural collapse. Accordingly, the preparation of the "partially collapsed" zeolite adsorbent can be carried out in consideration of the balance between the loss of the $CO_2$ adsorption capacity and the improvement in $CO_2$ selectivity due to the structural collapse.

Implementations

An implementation described herein provides a method of separating carbon dioxide ($CO_2$) from air, where the method includes: feeding air into a cooler to generate cooled air, the cooled air including nitrogen ($N_2$), oxygen ($O_2$), water ($H_2O$), and $CO_2$; feeding the cooled air to a first adsorption column including a first zeolite adsorbent to selectively capture the $H_2O$ from the cooled air, generating dried cooled air; and feeding the dried cooled air to a second adsorption column including a second zeolite adsorbent to selectively capture the $CO_2$ from the dried cooled air, generating a tail gas, wherein the second zeolite adsorbent includes a Linde Type A (LTA) aluminosilicate zeolite that is hydrolyzed and at least partially collapsed.

In an aspect, combinable with any other aspect, the air is atmospheric air.

In an aspect, combinable with any other aspect, the air has a $CO_2$ concentration of 380 parts per million (ppm) or greater.

In an aspect, combinable with any other aspect, the air further includes helium (He), methane ($CH_4$), argon (Ar), or hydrogen ($H_2$).

In an aspect, combinable with any other aspect, the cooled air has a temperature between −50° C. and 50° C.

In an aspect, combinable with any other aspect, the method further includes maintaining temperatures of the first adsorption column and the second adsorption column between −50° C. and 50° C.

In an aspect, combinable with any other aspect, the cooled air has a pressure of 10 bar (1 MPa) or less.

In an aspect, combinable with any other aspect, the first zeolite adsorbent includes a molecular sieve 3A.

In an aspect, combinable with any other aspect, the LTA aluminosilicate zeolite includes a plurality of pores characterized by a pore aperture size of from 0.33 nm to 0.38 nm.

In an aspect, combinable with any other aspect, the LTA aluminosilicate zeolite is characterized by a carbon dioxide/methane equilibrium selectivity factor in a range of 3.8 to 40.

In an aspect, combinable with any other aspect, the LTA aluminosilicate zeolite has a Na/Al ratio in a range of from 0.60 to 1.00.

In an aspect, combinable with any other aspect, the LTA aluminosilicate zeolite includes ammonium cations ($NH_4^+$).

An implementation described herein provides a method of separating carbon dioxide ($CO_2$) from a gas stream, where the method includes: feeding a gas into a cooler to generate a cooled gas, the cooled gas including nitrogen ($N_2$), water ($H_2O$), and $CO_2$; feeding the cooled gas to a first $H_2O$ adsorption column including a first zeolite adsorbent to selectively capture the $H_2O$ from the cooled gas, generating first dried cooled gas; feeding the first dried cooled gas to a first $CO_2$ adsorption column including a second zeolite adsorbent to selectively capture the $CO_2$ from the first dried cooled gas, wherein the second zeolite adsorbent includes a Linde Type A (LTA) aluminosilicate zeolite that is hydrolyzed and at least partially collapsed; and switching a flow of the cooled gas to a second $H_2O$ adsorption column including the first zeolite adsorbent, generating a second dried cooled gas by the second $H_2O$ adsorption column.

In an aspect, combinable with any other aspect, the method further includes feeding the second dried cooled gas to a second $CO_2$ adsorption column including the second zeolite adsorbent.

In an aspect, combinable with any other aspect, the method further includes, after the switching, regenerating the first $H_2O$ adsorption column by releasing the $H_2O$ captured by the first zeolite adsorbent.

In an aspect, combinable with any other aspect, the method further includes switching a flow of the first dried cooled gas to a second $CO_2$ adsorption column including the second zeolite adsorbent.

In an aspect, combinable with any other aspect, the method further includes stopping to feed the first dried cooled gas to the first $CO_2$ adsorption column; and regenerating the first $CO_2$ adsorption column by releasing the $CO_2$ captured by the second zeolite adsorbent.

An implementation described herein provides a system of separating carbon dioxide ($CO_2$) from air, where the system includes: a cooler to cool a feed gas; an $H_2O$ adsorption column to receive the feed gas from the cooler and to discharge a dried gas, the $H_2O$ adsorption column including a first zeolite adsorbent; and a $CO_2$ adsorption column to receive the dried gas from the $H_2O$ adsorption column and to discharge a tail gas, the $CO_2$ adsorption column including a second zeolite adsorbent, the second zeolite adsorbent including a Linde Type A (LTA) aluminosilicate zeolite that is hydrolyzed and at least partially collapsed.

In an aspect, combinable with any other aspect, the system further includes an additional $H_2O$ adsorption column to receive the feed gas from the cooler and to discharge a second dried gas, the additional $H_2O$ adsorption column including the first zeolite adsorbent; and an additional $CO_2$ adsorption column to receive the second dried gas from the additional $H_2O$ adsorption column and to discharge a second tail gas, the additional $CO_2$ adsorption column including the second zeolite adsorbent.

In an aspect, the system further includes a gas flow control system configured to switch a delivery of the feed gas between to the $H_2O$ adsorption column and to the additional $H_2O$ adsorption column.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. A method of separating carbon dioxide ($CO_2$) from air, the method comprising:

feeding air into a cooler to generate cooled air, the cooled air comprising nitrogen ($N_2$), oxygen ($O_2$), water ($H_2O$), and $CO_2$;

feeding the cooled air to a first adsorption column comprising a first zeolite adsorbent to selectively capture the $H_2O$ from the cooled air, generating dried cooled air; and feeding the dried cooled air to a second adsorption column comprising a second zeolite adsorbent to selectively capture the $CO_2$ from the dried cooled air, generating a tail gas, wherein the second zeolite adsorbent comprises a Linde Type A (LTA) aluminosilicate zeolite that is hydrolyzed and at least partially collapsed.

2. The method of claim 1, wherein the air is atmospheric air.

3. The method of claim 1, wherein the air has a $CO_2$ concentration of 380 parts per million (ppm) or greater.

4. The method of claim 1, wherein the air further comprises helium (He), methane ($CH_4$), argon (Ar), or hydrogen ($H_2$).

5. The method of claim 1, wherein the cooled air has a temperature between −50° C. and 50° C.

6. The method of claim 1, further comprising maintaining temperatures of the first adsorption column and the second adsorption column between −50° C. and 50° C.

7. The method of claim 1, wherein the cooled air has a pressure of 10 bar (1 MPa) or less.

8. The method of claim 1, wherein the first zeolite adsorbent comprises a molecular sieve 3A.

9. The method of claim 1, wherein the LTA aluminosilicate zeolite comprises a plurality of pores characterized by a pore aperture size of from 0.33 nm to 0.38 nm.

10. The method of claim 1, wherein the LTA aluminosilicate zeolite is characterized by a carbon dioxide/methane equilibrium selectivity factor in a range of 3.8 to 40.

11. The method of claim 1, wherein the LTA aluminosilicate zeolite has a Na/Al ratio in a range of from 0.60 to 1.00.

12. The method of claim 1, wherein the LTA aluminosilicate zeolite comprises ammonium cations ($NH_4^+$).

13. A method of separating carbon dioxide ($CO_2$) from a gas stream, the method comprising:

feeding a gas into a cooler to generate a cooled gas, the cooled gas comprising nitrogen ($N_2$), water ($H_2O$), and $CO_2$;

feeding the cooled gas to a first $H_2O$ adsorption column comprising a first zeolite adsorbent to selectively capture the $H_2O$ from the cooled gas, generating first dried cooled gas;

feeding the first dried cooled gas to a first $CO_2$ adsorption column comprising a second zeolite adsorbent to selectively capture the $CO_2$ from the first dried cooled gas, wherein the second zeolite adsorbent comprises a Linde Type A (LTA) aluminosilicate zeolite that is hydrolyzed and at least partially collapsed; and switching a flow of the cooled gas to a second $H_2O$ adsorption column comprising the first zeolite adsorbent, generating a second dried cooled gas by the second $H_2O$ adsorption column.

14. The method of claim 13, further comprising feeding the second dried cooled gas to a second $CO_2$ adsorption column comprising the second zeolite adsorbent.

15. The method of claim 13, further comprising, after the switching, regenerating the first $H_2O$ adsorption column by releasing the $H_2O$ captured by the first zeolite adsorbent.

16. The method of claim 13, further comprising switching a flow of the first dried cooled gas to a second $CO_2$ adsorption column comprising the second zeolite adsorbent.

17. The method of claim 13, further comprising:

stopping to feed the first dried cooled gas to the first $CO_2$ adsorption column; and regenerating the first $CO_2$ adsorption column by releasing the $CO_2$ captured by the second zeolite adsorbent.

18. A system of separating carbon dioxide ($CO_2$) from air, the system comprising:

a cooler to cool a feed gas;

an $H_2O$ adsorption column to receive the feed gas from the cooler and to discharge a dried gas, the $H_2O$ adsorption column comprising a first zeolite adsorbent; and a $CO_2$ adsorption column to receive the dried gas from the $H_2O$ adsorption column and to discharge a tail gas, the $CO_2$ adsorption column comprising a second zeolite adsorbent, the second zeolite adsorbent comprising a Linde Type A (LTA) aluminosilicate zeolite that is hydrolyzed and at least partially collapsed.

19. The system of claim 18, further comprising:

an additional $H_2O$ adsorption column to receive the feed gas from the cooler and to discharge a second dried gas, the additional $H_2O$ adsorption column comprising the first zeolite adsorbent; and an additional $CO_2$ adsorption column to receive the second dried gas from the additional $H_2O$ adsorption column and to discharge a second tail gas, the additional $CO_2$ adsorption column comprising the second zeolite adsorbent.

20. The system of claim 19, further comprising a gas flow control system configured to switch a delivery of the feed gas between to the $H_2O$ adsorption column and to the additional $H_2O$ adsorption column.

* * * * *